United States Patent [19]

Jadamus et al.

[11] Patent Number: 4,755,552

[45] Date of Patent: Jul. 5, 1988

[54] IMPACT-RESISTANT POLYAMIDE MOLDING COMPOUNDS

[75] Inventors: Hans Jadamus, Marl; Michael Droescher, Dorsten; Wilfried Bartz, Marl, all of Fed. Rep. of Germany

[73] Assignee: Huels Aktiengesellschaft, Marl, Fed. Rep. of Germany

[21] Appl. No.: 40,896

[22] Filed: Apr. 21, 1987

[30] Foreign Application Priority Data

Apr. 22, 1986 [DE] Fed. Rep. of Germany ....... 3613527

[51] Int. Cl.$^4$ .............................................. C08K 5/01
[52] U.S. Cl. ................................... 524/491; 524/490; 525/184
[58] Field of Search .................. 525/66, 184; 524/490, 524/491

[56] References Cited

U.S. PATENT DOCUMENTS

| | | | |
|---|---|---|---|
| 3,262,989 | 7/1966 | Brignac | 525/184 |
| 4,293,662 | 10/1981 | Heydenreich | 525/184 |
| 4,383,084 | 5/1983 | Paschke | 525/184 |
| 4,555,566 | 11/1985 | Arita | 525/184 |

*Primary Examiner*—Paul R. Michl
*Attorney, Agent, or Firm*—Millen & White

[57] ABSTRACT

Impact-resistant polyamide molding compounds are provided consisting of a mixture of (A) from about 80 to about 99% by weight of a polyamide having an $ETA_{rel}$ value of from about 1.2 to about 2.4 and (B) from about 2 to about 20% by weight of a polyalkenamer having a viscosity number of from about 50 to about 400 ml/g.

20 Claims, No Drawings

IMPACT-RESISTANT POLYAMIDE MOLDING COMPOUNDS

CROSS REFERENCE TO RELATED APPLICATION

This application is related to U.S. Application Ser. No. 040,917, filed on 4/21/87 which disclosure is incorporated by reference herein.

BACKGROUND OF THE INVENTION

This invention relates to impact-resistant polyamide molding compounds.

Polyamides are known and proven construction materials which can be processed, e.g., by injection molding or extrusion processes. In general, polyamides, especially after conditioning, exhibit good toughness. However, for certain uses, improvements with respect to impact strength and notch impact strength in the injection fresh condition (i.e., immediately after injection molding) and especially at low temperatures are desirable.

A suitable way of approaching this goal is the use of polyamide blends, i.e., intimate mixtures of polyamides with tough elastomers or tough, high-molecular weight thermoplastics. Special primary properties of these added polymers can thus be transferred to the polyamide blends without destroying the typical polyamide properties.

To obtain polyamide blends with satisfactory properties, in each case the polymers to be mixed in are optimized for the specific use and the respective polyamide type employed in the blend. Since such special polymers are not available on the market in the necessary variety, as a rule thee is the problem that in each case special products in mostly small amounts must be produced in a cost intensive way.

Because of these problems, in practice an alternative approach is taken in the production of polyamide-blend polymers which requires the use of olefinic polymers, available in large amounts and varieties, e.g., polyethylene or ethylene/propylene/diene copolymers, which exhibit a high cold or notch strength.

According to DE-PS No. 11 31 883, mixtures of (1) polycondensates containing carbonamide groups; (2) polyolefins, polystyrene, olefin or styrene copolymers, which, besides olefin or styrene, can also contain other olefinic unsaturated monomers incorporated by polymerization; and (3) catalyst forming radicals are homogenized at 50° to 350° C., whereby graft copolymers form from (1) and (2). However, the products thus obtained are not completely satisfactory, since crosslinking occurs, which results in inadequate processability.

The obviously preferred and most effective embodiment of the alternative approach discussed above consists of the grafting of high-molecular weight olefinic elastomers referably with, e.g., maleic anhydride, according to the working processes as described in DE-OS No. 24 01 149. However, such processes have the disadvantage that because of the action of maleic anhydride, which is greatly hazardous to health, the reaction cannot easily be performed in the usual industrial installations. Moreover, the effective elastomers are difficult to handle because of their tackiness, and because the aggregates possess a high shear strength and due to the thermal stress involved, the graft process often results in damages to the elastomers because of discolorations, decomposition and/or partial cross-linking.

All the products that can be used for the alternative method described above must exhibit a high molecular weight and consequently have high melting viscosities, if they are to produce good results in the polyamide blends. At the same time optimal properties and efficiency are attained only if the added polymers are finely dispersed in the polyamide matrix. This incorporation causes difficulties because of the high viscosity of the addition polymers and because of the unfavorable polyamide/added polymer viscosity relationship. Fluctuations in the flow rate and shearing conditions make the production of a reproducibly good quality difficult. Use of aggregates possessing a high shear strength does reduce the scattering of the values but requires a high energy expenditure and can result in damage to the polyamide blends.

SUMMARY OF THE INVENTION

It is an object of this invention is to avoid the disadvantages of the prior art while at the same time maintaining the known desirable properties of polyamide blends.

Upon further study of the specification and appended claims, further objects and advantages of this invention will become apparent to those skilled in the art.

These objects are achieved by providing polyamide molding compositions comprising an intimate mixture of A. from about 80 to about 98% by weight of a polyamide having an Eta$_{rel}$ value of from about 1.2 to about 2.4 (measured according to DIN 53 727 in 0.5 g/dl of m-cresol solution/25° C.) and B. from about 2 to about 40% by weight of a polyalkenamer having a viscosity number (J) in the range of from about 50 to about 400 ml/g (measured according to DIN 53 726 in 0.5 g/dl of toluene solution/25° C.)

DETAILED DESCRIPTION

Homopolyamides PA 6, 11, 12, 46, 66, 68, 69, 610, 612, etc. are suitable as polyamides (component A).

Corresponding copolyamides can also be used. Monomers which can be employed to produce the homo- and co-polyamides include (cyclo)aliphatic diamines having 4 to 12 C atoms, e.g., tetramethylenediamine, hexamethylenediamine and isophoronediamine, aliphatic or aromatic dicarboxylic acids having 6 to 12 C atoms, e.g., adipic acid, azelaic acid, suberic acid, dodecanedioic acid, isophthalic acid and terephthalic acid, etc., or alpha, omega aminocarboxylic acids or their lactams with 6 to 12 C atoms such as, e.g., caprolactam and laurolactam.

The polyamides exhibit a relative solution viscosity (ETA$_{rel}$) (measured according to DIN 53 727 at 25° C. in 0.5 g/dl of m-cresol solution) of from about 1.2 to about 2.4 preferably of 1.6 to 2.3. The relation between ETA$_{rel}$ and J-value is as follows:

$$(ETA_{rel} - 1)/C = J.$$

Carboxyl and/or amino groups are usually present as end groups of the polyamides. Polyamides with nonpolar end groups can also be used. When polyalkenamers with functional end groups are used, polyamides are preferred whose end groups consist of 20 to 100 mol %, especially 40 to 70 mol % of amino groups.

Component A can also be a mixture of two or more polyamides, the relative amounts being non-critical.

The polyamides as such are known and can be produced according to the prior art (Kirk-Othmer, Encyclopedia of Chemical Technology, Vol. 18, John Wiley and Sons (1982), pages 328 to 435, U.S. Pat. Nos. 2,071,250; 2,071,251; 2,130,523; 2,130,948; 2,241,322; 2,312,966; 2,512,606; and 3,393,210) which disclosures are incorporated by reference herein.

Suitable polyalkenamers are obtained from cyclic olefins, which exhibit at least one unsubstituted ring double bond, with the aid of so-called metathesis catalysts by opening of the ring by polymerization (DE-OSS Nos. 15 70 940, 16 45 038, 17 20 798, 17 70 143 and 18 05 158, DE-AS No. 12 99 868, GB-PSS Nos. 1 124 456, 1 194 013 and 1 182 975) which disclosures are incorporated by reference herein.

Suitable cyclic olefins include unsaturated hydrocarbons with 4 to 12 (except 6) ring carbon atoms in one or more rings, e.g., 1-2 rings, which exhibit in at least one ring an unsubstituted double bond which is not in conjugation with other double bonds which may be present and which may have any degree of substitution, for example, cyclobutene, cyclopentene, cycloheptene, cis- and trans-cyclooctene, cyclononene, cyclodecene, cy- cloundecene, cis- and trans-cyclododecene, cis-cis-cyclooctadiene-(1,5), 1-methylcyclooctadiene(1,5), 3-methylcyclooctadiene-(1,5), 3,7-dimethylcyclooctadiene-(1,5).

The double bonds in the polyalkenamers can be present in the cis- or trans-form in an amount typically of 10-90. Preferably the polyalkenamers have a content of trans-double bonds such that the polymers exhibit a sufficient crystalline portion that at room temperature they are practically tack-free and thus can easily be handled in granular, crumb, pellet or powder form, e.g., 70-90% of the total double bond content.

Polyalkenamers with molecular weights corresponding to a viscosity number of 50 to 400 ml/g, preferably 80 to 160 ml/g, measured at 25° C. as 0.5 g/dl solution of toluene are suitable.

The viscosity number (J) is determined analogously to DIN 53 726.

Polyalkenamers as such and their production are known (Kautschuk+Gummi, Kunststoffe 1981, pages 185 to 190; K. J. Ivin, Olefin Metathesis, Academic Press 1983, page 190 ff).

The polyalkenamers can contain functional groups, e.g., epoxy, carboxyl or carboxylic acid anhydride groups can be present in the polyalkenamers. The introduction of these functional groups in the polyalkenamers takes place according to known processes in solution or in the melt.

Epoxy groups can be introduced, for example, by partial epoxidation of the double bonds with peracids. The content of epoxide oxygen should be 0.5 to 9, preferably 3 to 8 mass %. Alternatively, usable epoxy derivatives can be attained by grafting with, for example, glycidyl methacrylate. Introduction of carboxyl or carboxylic acid anhydride groups takes place by grafting with suitable unsaturated monomers which contain carboxyl or carboxylic acid anhydride groups. Suitable carboxyl and carboxylic acid anhydride compounds are those containing 4-20 C atoms. For example, (meth)acrylic acid, maleic acid (anhydride), fumaric acid, maleic acid monoester, fumaric acid monoester, norbornenedicarboxylic acid anhydride, itaconic acid (anhydride) and similar compounds can be employed. Based on experience a grafted monomer content of 0.2 to 5% by weight, preferably of 0.5 l to 3% by weight in relation to the polyalkenamer is sufficient. The modification of the polyalkenamers is not the object of this invention. A person of ordinary skill in the art can readily optimize the conditions required by routine optimization experiments and can readily determine by simple tests whether a sufficient degree of grafting exists for the desired purpose using conventional considerations. Other functional groups or substituents can be introduced besides the functional groups listed above. All modification operations are performed so that no crosslinking and/or unacceptable increase in molecular weight occurs in the polyalkenamers according to conventional considerations. The gel content of the modified polyalkenamers, determined as insoluble portion in hot toluene, must be less than 10% by weight, preferably less than 5% by weight; the viscosity numbers should not be substantially, i.e., maximally 20%, above those of the initial polyalkenamers.

The molding compounds of this invention contain from about 80 to about 98% by weight of polyamide. Preferably, they contain from about 85 to about 95% by weight of polyamide. Besides the polyamide, the molding compounds of this invention contain from about 2 to about 20% by weight, preferably from about 5 to about 15% by weight, of polyalkenamer. When polyalkenamers without functional groups are employed, their portion should preferably not exceed 15% by weight of the molding compound. Intimate mixture means good dispersion; e. g. more than 50% by weight of the polyoctenylene particles are smaller than 20 μm in diameter. This is achieved by intensive mixing in a static or continous melt mixer.

The usual auxiliary agents and additives, such as stabilizers, plasticizer, processing agents, antistatic agents, flameproofing agents, etc., can be incorporated in the molding compounds according to the invention, if necessary. It is also possible to use fillers and reinforcing fillers, such as minerals, glass or carbon fibers, micro glass balls, soot and the like. Polymer additives, impact-resistance modifiers, etc., can also be used in minor amounts. These are all used in conventional amounts.

The molding compounds according to the invention exhibit the unexpected advantage that it is possible to work with easily accessible, i.e., commercially available, polymers to improve the impact strength. The prior art does describe active added polymers (functionalized rubbers, polyolefins), but these in each case must be produced separately and only in small amounts. Moreover, the polyalkenamers of this invention, in comparison with the already known polymers used in improviding the impact strength, produce synergistic effects so that in such a case smaller amounts of added polymers need be incorporated into the polyamide to achieve similar effects.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the following examples, all temperatures are set forth uncorrected in degrees Celsius; unless otherwise indicated, all parts and percentages are by weight.

In the following examples, the notch impact strength tests according to ISO 180 were performed on injection molded standard small bars at the indicated temperatures. Between the injection molding and tests the bars were stored for about 24 hours at 50% relative humidity (23° C.).

Examples identified by letters are comparative examples not according to the invention.

EXAMPLES

1. Feedstocks
1.1 Polyamide 6
   Polyamide 6 (Eta$_{rel}$: 1.99; ULTRAMID ®B4)
1.2 Polyamide 12
   Polyamide 12 (Eta$_{rel}$: 2.15; VESTAMID ®X 1852)
1.3 Polyamide 12 containing plasticizer
   90 parts by weight of polyamide 12 (1.1)
   10 parts by weight of benzenesulfonic acid N-n-butylamide
   1 part by weight of NN'-hexamethylene-bis-(3,5-di-tert-butyl-4-hydroxy)-dihydrocinnamic acid amide, are melted in a twin-screw kneader at 220° C., mixed, granulated and dried to a residual moisture of 0.05%.
1.4 Polyoctenamer
   Polyoctenamer (J: 120 ml/g; trans-content: 80%, VESTENAMER ®8012)
1.5 EPDM rubber
   EPDM rubber (73% by weight of ethylene; 22% by weight of propylene; 5% by weight of ethylidenenorbornene; Mooney value (ML$_{1+4}$ 100° C.): 85; BUNA ®AP 437)
1.6 Functionalized EPDM rubber
   An adduct of melic acid anhydride (2.5% by weight) the EPDM rubber-(1.5) (97.5% by weight) is produced according to the method described in DE-OS No. 24 01 149, example 1.
1.7 Polyethylene
   Polyethylene (VESTOLEN ®A 4516)
2. Production of molding compound
2.1 Molding compound of polyamide 6 and polyoctenamer (table I)

A melt mixture, which was granulated in the usual way, was produced from polyamide 6 (1.1) and polyoctenamer (1.4) in a twin-screw kneader (Model ZSK 30, Werner und Pfleiderer company) at 260° C. It was dried to a residual moisture of 0.1% by weight.

TABLE I

| Test | PA 6* | Polyoctenamer [% by weight] | Notch Impact Strength [kJ/m$^2$] |
|---|---|---|---|
| A | 100 | — | 7 |
| 1 | 90 | 10 | 23 |

*Polyamide 6

2.2 Molding comound of polyamide 12 (1.1) and polyoctenamer (1.6) (Table II)

The process was as described under 2.1 with the difference that the remelting was at 240° C. instead of 260° C. A polyethylene (1.7) was used for comparison.

TABLE II

| Test | PA 12* | PE** | Polyoctenamer [% by weight] | Notch Impact Strength [kJ/m$^2$] |
|---|---|---|---|---|
| B | 100 | — | — | 14 |
| C | 90 | 10 | — | 22 |
| 2 | 90 | — | 10 | 36 |

*polyamide 12
**polyethylene 2.3 Molding compound of polyamide 12 (1.3) and polyoctenamer (1.4) (Table III)

Melt mixtures, converted to granulate in the usual way, were produced from 90% by weight of polyamide 12 (1.3) containing plasticizer and 10% by weight of the addition polymers indicated in the table in a twin-screw kneader at 220° C. The granulate was dried to a residual moisture of 0.07%.

Pipes with an outside diameter of 6.35 mm and wall thickness of 1 mm were produced from the granulates on a 25 D single-screw extruder with 3-zone screw at a mass temperature of about 220° C.

Some of the pipes were boiled in water for 2 hours, others were annealed for 24 hours in a heating furnace at 110° C. 10 each of the annealed pipes and of the pipes treated in the boiling water, respectively, were subjected to the low-temperature impact tests described in SAE J 844 at −40° and −50° C.

TABLE III

| | | Number of broken pipes of 10 tested | | | |
|---|---|---|---|---|---|
| | Addition | boiled | | annealed | |
| Test | Polymer | −40° C. | −50° C. | −40° C. | −50° C. |
| D | — | 10 | 10 | 8 | 10 |
| E | EPDM (1.5) | 10 | 10 | 10 | 10 |
| F | EPDM (1.6) | 1 | 8 | 1 | 0 |
| 3 | polyoctenamer (1.4) | 0 | 0 | 0 | 0 |

2.4 Molding compound of polyamide 6 (1.1), a functionalized EPDM (1.6) and polyoctenamer (1.4) (Table IV)

The granulate was obtained according to 2.1.

TABLE IV

| Test | PA 6 [% by weight] | EPDM (1.6) | Polyoctenamer (1.4) [kJ/m$^2$] | Notch Impact Strength |
|---|---|---|---|---|
| G | 80 | 20 | — | 61 |
| 4 | 80 | 10 | 10 | 95 |

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:
1. An impact-resistant polyamide molding composition comprising an intimate mixture of
   A. from about 80 to about 98% by weight of a polyamide having an Eta$_{rel}$ value from about 1.2 to about 2.4 and
   B. from about 2 to about 20% by weight of a polyalkenamer having a viscosity number of from about 50 to about 400 ml/g.

2. An impact-resistant polyamide molding composition of claim 1 wherein said polyamide is present in an amount of about 85 to about 95% by weight and said polyalkenamer is present in an amount of about 5 to about 15% by weight.

3. A molding composition of claim 1, wherein the polyamide has an $ETA_{rel}$ value of from about 1.6 to about 2.3.

4. A molding composition of claim 1, wherein the polyalkenamer has a viscosity number of from about 80 to about 160 ml/g.

5. A molding composition of claim 1, wherein the polyamide has an $ETA_{rel}$ value of from about 1.0 to about 2.3 and the polyalkenamer has a viscosity number of from about 80 to about 160 ml/g.

6. A molding composition of claim 1, wherein the polyalkenamer is functionized by epoxy groups.

7. A molding composition of claim 6, wherein the content of epoxy groups is from about 0.5 to about 9 mass %.

8. A molding composition of claim 7, wherein the content of epoxy groups is from about 3 to about 8 mass %.

9. A molding composition of claim 6, wherein the polyalkenamer contains carboxyl group-containing monomers grafted onto the polyalkenamer.

10. A molding composition of claim 9, wherein the grafted monomer content is from about 0.2 to about 5% by weight in relation to the polyalkenamer.

11. A molding composition of claim 10, wherein the grafted monomer content is from about 0.5 to about 3% by weight in relation to the polyalkenamer.

12. A molding composition of claim 1, wherein said polyalkenamer is prepared from a cyclic olefin having 1-2 rings and which has at least one non-conjugated double bond.

13. A molding composition of claim 1, wherein said polyamide is a homopolyamide selected from the group consisting of PA6, PA11, PA12, PA46, PA66, PA68, PA69, PA610 or PA612.

14. A molding composition of claim 1, wherein the polyalkenamer contains epoxy, carboxyl or carboxylic acid anhydride and groups and the polyamide contains from about 20 to about 100 mol% amino groups.

15. A molding composition of claim 1, wherein the polyalkenamer contains epoxy, carboxyl or carboxylic acid anhydride groups and the polyamide contains from about 40 to about 70 mol% amino groups.

16. A molding composition of claim 1, wherein the polyamide is prepared from (cyclo)aliphatic diamines having from 4 to 12 C atoms.

17. A molding composition of claim 1, wherein the polyamide is prepared from carboxylic acids having from 6 to 12 C atoms.

18. A molding composition of claim 1, wherein the polyamide is prepared from an alpha, omega-aminocarboxylic acid or a lactam thereof, each having 6 to 12 C atoms.

19. A molding composition of claim 1, wherein the polyalkenamer is prepared from an unsaturated cyclic olefin having from 4–5 or 7–12 C atoms.

20. In a molded product prepared by molding a molding composition, the improvement wherein the molding composition is one of claim 1.

* * * * *